United States Patent
Tarle et al.

(10) Patent No.: US 6,958,980 B2
(45) Date of Patent: Oct. 25, 2005

(54) ESTABLISHING CALL SESSIONS BETWEEN TERMINALS THROUGH PLURAL SWITCH SYSTEMS

(75) Inventors: Peter G. Tarle, Belleville (CA); Mitchell D. Coffin, Belleville (CA); Mark Y. Bissell, Madoc (CA); Adel E. Mostafa, Belleville (CA); Francois Audet, Santa Clara, CA (US)

(73) Assignee: Nortel Networks Limited, St. Laurent (CA)

( * ) Notice: Subject to any disclaimer, the term of this patent is extended or adjusted under 35 U.S.C. 154(b) by 752 days.

(21) Appl. No.: 09/745,202

(22) Filed: Dec. 20, 2000

(65) Prior Publication Data

US 2002/0075849 A1 Jun. 20, 2002

(51) Int. Cl.[7] ............................................. H04L 12/16
(52) U.S. Cl. ...................................... 370/259; 370/397
(58) Field of Search ....................... 379/221.14, 265.02, 379/15.02, 142.04, 216.01, 221.08; 370/230, 351–3, 389, 395.1, 397, 395.2, 395.3, 400–2, 409, 475, 431, 259, 392–393

(56) References Cited

U.S. PATENT DOCUMENTS

| | | | |
|---|---|---|---|
| 6,490,451 B1 * | 12/2002 | Denman et al. | 455/436 |
| 6,560,216 B1 * | 5/2003 | McNiff et al. | 370/349 |
| 6,603,761 B1 * | 8/2003 | Wang et al. | 370/352 |
| 6,622,016 B1 * | 9/2003 | Sladek et al. | 379/201.01 |
| 2002/0001302 A1 * | 1/2002 | Pickett | 370/352 |

* cited by examiner

*Primary Examiner*—David Vincent
(74) *Attorney, Agent, or Firm*—Trop, Pruner & Hu, P.C.

(57) ABSTRACT

A communications system includes a first switch and a second switch coupled to a packet-based network. A first set of network terminals are coupled to the first switch, and a second set of network terminals are coupled to the second switch. Each of the terminals is associated with a virtual terminal number (VTN). Each of the first and second switches store profile information associated with VTNs of the terminals. The profile information relate to the capabilities or features of the network terminals. The switches communicate signaling over a packet-based trunk, or virtual trunk, that is established on the packet-based network. Each switch sends messages to their associated terminals to establish media paths over the packet-based network to establish a call session.

30 Claims, 7 Drawing Sheets

ESTABLISHING CALL SESSIONS BETWEEN TERMINALS THROUGH PLURAL SWITCH SYSTEMS

TECHNICAL FIELD

The invention relates generally to establishing call sessions between terminals through plural call servers.

BACKGROUND

Many types of communications are possible over data networks, including electronic mail, web browsing, file downloads, electronic commerce transactions, text chat, and so forth. Networks include private networks, such as local area networks (LANs) or wide area networks (WANs), and public networks, such as the Internet.

With the increased capacity and reliability of packet-based data networks, voice communications (including telephone calls, video conferencing, and so forth) over data networks have become possible. Voice communications over packet-based data networks are unlike voice communications in a conventional public-switched telephone network (PSTN), which provides users with dedicated, end-to-end circuit connections (e.g., one or more time slots of a given channel) for the duration of each call. In a circuit-switched network, speech and control data are routed over the dedicated circuit connection during the call session. In contrast, communications over packet-based data networks, such as IP (Internet Protocol) networks, are performed using packets or datagrams that are sent in bursts from a source to one or more destination nodes. In a packet-based network, a dedicated channel portion is not provided; instead, the communications network is shared, with routing of packets performed based on addresses carried in the packets.

The types of equipment that may be used to perform telephony communications over packet-based data networks include computers that have voice processing components, including a speaker and a microphone. Such computers also include audio coder/decoders (CODECs), implemented in hardware and/or software, that convert between audio and digital data. The telephony application running in such a computer is often referred to as a soft phone application, and the computer itself may be referred to as a "soft phone." One example soft phone application is the i2050 product from Nortel Networks Limited.

Another type of terminal that is capable of telephony communications over a packet-based data network is a network telephone, such as the i2004 telephone set from Nortel. A network telephone may include a network interface and various layers (including network and transport layers) to enable communication of voice data over the data network.

In conventional circuit-switched telephony networks, telephones are coupled to a switch, such as a private exchange system (e.g., a PBX or private branch exchange system, a key telephone system, and so forth). A signaling channel between the switch and the telephone carries control signaling such as an alert message (to indicate an incoming call), commands to update the telephone display, an off-hook indication, an on-hook indication, an on-hold indication, signals carrying button or key presses of the telephone, and so forth. Depending on which physical port of the switch the telephone is connected to, a terminal number (TN) is assigned to the telephone by the switch.

The switch is able to establish a circuit-switched call connection between a first telephone (connected to the switch) and a second telephone (which may or may not be connected to the switch. If the second telephone is coupled to another switch, then signaling and data are exchanged between the switches over a trunk. The trunk can be an Integrated Services Digital Network (ISDN) link, such as a basic rate interface (BRI) or primary rate interface (PRI).

With the advent of packet-based network telephony (e.g., IP telephony), terminals (e.g., network telephones or soft phones) are no longer connected directly to a switch. Instead, the terminals are coupled over a LAN, WAN, Internet, or other packet-based network to a packet network-enabled switch system. In some arrangements, the network-enabled switch system includes both a network interface (to the packet-based network) and a circuit network interface (to a circuit-switched line such as a time-division multiplexing or TDM line). On a TDM line, plural time slots are defined on a channel, with one or more time slots assigned to communications between the telephone and the switch.

In a call between two network terminals, the network-enabled switch converts voice data of a first network terminal from a packet format to a circuit-switched data format (e.g., TDM format). The network-enabled switch then converts the voice data back into packet format for communication to the second network terminal.

For a call between a first network terminal connected to a first network-enabled switch and a second network terminal connected to a second network-enabled switch, multiple conversions between TDM and packet formats may have to be performed. For example, voice data from the first network terminal is converted from a packet format to TDM format and communicated over a trunk (e.g., a circuit-switched trunk) from the first switch to the second switch. In the second switch, the voice data in TDM format is reconverted back to packet format and communicated to the second network terminal.

When performing conversions between TDM and packet format, degradation of voice data may occur. Degradation may result from compression and decompression of the voice data, algorithmic delay, and effects of jitter buffers. The degradation is made even worse if the trunk between the first and second switches is a packet-based trunk. In this scenario, the voice data from the first network terminal is converted from a packet format to a TDM format by the first switch, followed by conversion from the TDM format to a packet format in the first switch for communication over the packet-based trunk. Next, the second switch converts the voice data received over the packet-based trunk from the packet format to TDM format, followed by conversion from the TDM format back to the packet format for communication to the second network terminal.

SUMMARY

In general, according to one embodiment, a switch system for establishing calls over a packet-based network comprises an interface adapted to communicate over the packet-based network. A controller is communicatively coupled to the interface and is adapted to receive a call request from a first terminal that is associated with a logical identifier. The call request targets a second terminal that is coupled to a second switch system. The controller is adapted to further send signaling to the second switch system over a packet-based trunk provided over the packet-based network. A storage unit contains information relating to features of the first terminal, the information associated with the logical identifier of the first terminal.

Some embodiments of the invention may have one or more of the following advantages. Better quality is provided for users of network telephony terminals (or other terminals capable of real-time, interactive call sessions) in communications between a first terminal coupled to a first switch and a second terminal coupled to another switch. By avoiding the performance of plural conversions between circuit-switched and packet formats in plural switches, degradation of voice data can be reduced. In addition, less processing needs to be performed due to the reduced need for translations between different formats, enabling less complex systems to reduce costs of such systems.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
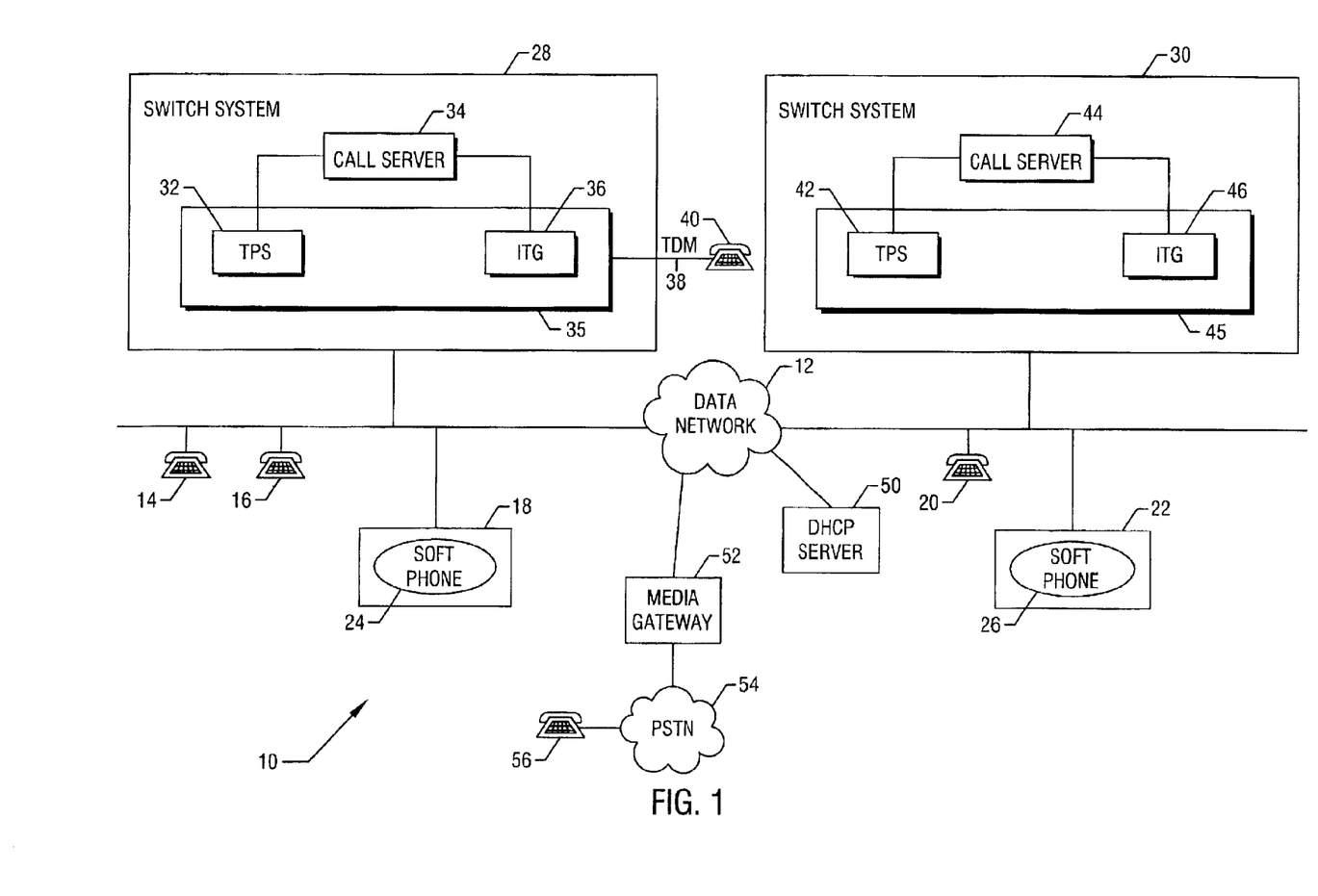
FIG. 1 is a block diagram of an embodiment of a communications system in accordance with an embodiment.

Referring to FIG. 1, a communications system 10 includes a packet-based data network 12 that is coupled to various network elements. The packet-based data network 12 may be a local area network (LAN) or a wide area network (WAN). Additionally, or alternatively, the data network 12 can be a public network such as the Internet. Although referred to in the singular, the data network 12 can actually include one or more networks (with routers enabling communication through the one or more networks).

The various network elements that are coupled to the data network 12 in the illustrated example includes network terminals 14, 16, 18, 20, and 22 that are capable of performing telephony (voice) and other forms of real-time, interactive communications (e.g., video conferencing, multimedia communications, and so forth). Examples of the network terminals 14, 16, and 20 include network telephones, such as the i2004 network telephone from Nortel Networks Limited. Examples of the network terminals 18 and 22 include computer systems (e.g., desktop computer systems or laptop computer systems) that are fitted with voice processing capabilities to enable telephony or other real-time, interactive communications over the data network 12. The network terminals 18 and 22 include a soft phone routine 24 and 26, respectively, that manages the establishment of packet-based calls over the data network 12.

One example of a packet-based communications protocol that can be used on the data network 12 is the Internet Protocol (IP). One version of IP is described in Request for Comments (RFC) 791, entitled "Internet Protocol," dated September 1981; and another version of IP is described in RFC 2460, entitled "Internet Protocol Version 6 (IPv6) Specification," dated December 1998. Other types of packet-based data networks can also be employed, such as Asynchronous Transfer Mode (ATM) packet-based data networks. ATM is a standard established by the International Telegraph and Telephone Consultative Committee Communications (CCITT) Standard Organization.

An IP network differs from an ATM network in that an IP network is a connectionless, packet-based network, while an ATM network is a connection-oriented, packet-based network. In a connection-oriented network, virtual circuits are established between endpoints so that packets are sent along those virtual circuits between the endpoints. Establishment of the virtual circuits ensures the in-order delivery of packets from a source to a destination. In a connectionless communication network, on the other hand, circuits or connections (whether virtual or physical) are not defined between endpoints. Instead routing is based on addresses within packets, so that the packets can potentially be routed along different paths. As a result, the packets may arrive in an order that is different than the transmission order.

Also coupled to the data network 12 are a first switch system 28 and a second switch system 30. In the illustrated embodiment, the switch system 28 includes a terminal proxy server (TPS) 32, a call server 34, and an ITG (Internet telephony gateway) module 36. In one example, the TPS 32 and the ITG module 36 reside on an electronic card or other platform 35. Alternatively, the TPS 32 and the ITG module 36 can reside on different platforms. The ITG module 36 provides physical ports that are coupled to circuit-switched lines 38 for connection to telephones 40. In one example, the circuit-switched line 38 is a time-division multiplexing (TDM) line. The call server 34 is responsible for the switching of calls involving network terminals coupled to the data network 12 as well as to circuit-switched terminals such as the telephone 40. In addition, the call server 34 provides a number of services to various users, such as voice mail, call forwarding, speed dial, and so forth.

The switch system 30 similarly includes a TPS 42, a call server 44 and an ITG module 46 that is capable of being connected to circuit-switched lines (not shown). The TPS 42 and ITG module 46 are resident on a card or platform 45. The first and second switch systems 28 and 30 are capable of communicating with each other over the packet-based data network 12.

Circuits or paths between a network terminal and a switch system is referred to as a "line." Thus, in FIG. 1, the line between the telephone 40 and the switch system 28 is a circuit-switched line, while the line between the network terminals 14, 16, and 18 and the first switch system 28 is a packet-based line (through the data network 12). The circuit or path between the switch systems 28 and 30 is referred to as a "trunk." In traditional telephony networks, trunks are usually circuit-switched trunks, such as a basic rate interface (BRI) or primary rate interface (PRI) according to an Integrated Services Digital Network (ISDN). However, in the arrangement of FIG. 1, the trunk between the switch systems 28 and 30 is a packet-based trunk (also referred to as a "virtual trunk"). The packet-based trunk or virtual trunk resides on the packet-based network 12. In effect, a packet-based trunk is established by identifying, in each switch system 28 or 30, the IP address of the other switch system. Signaling between the switch systems is carried in IP packets containing the source IP address of one switch system and the destination IP address of the other switch system.

By signaling the switch system 28 or 30, each of the network terminals 14, 16, 18, 20, and 22 is able to establish a call session with another network terminal. A network terminal can also establish a call with a telephone 56 coupled to a public switched telephone network 54. A media gateway 52 converts voice between packet format and circuit-switched format (for communication over the PSTN 54).

In some embodiments, a Dynamic Host Configuration Protocol (DHCP) server 50 is also coupled to the data network 12. DHCP is described in RFC 1541, entitled "Dynamic Host Configuration Protocol," dated October 1993. With DHCP support, a system (such as any one of the terminals 14, 16, 18, 20, and 22) coupled to the data network 12 that starts up or establishes a new connection is provided its configuration (including its IP address) by the DHCP server 50.

In accordance with some embodiments, although the network terminals 14, 16, 18, 20, and 22 interact with the switch systems 28 and 30 to establish call sessions, the media path between two network terminals for an established call session is provided through the data network 12 directly without passing through the switch systems 28 and 30. By doing so, the network terminals involved in a call session can send voice packets directly to each other through the data network 12 (and routers in the data network 12). This avoids the need to perform multiple conversions between packet format and TDM format or other circuit-switched format that would conventionally be performed in each switch system. However, if the call involves a network terminal and a telephone connected to a TDM line, then conversion between packet format and TDM format is performed by the appropriate one of the ITG modules 36 and 46.

Each network terminal is identified by a virtual terminal number (VTN) in the switch system 28 or 30. Since the network terminals are not connected to physical ports of the switch system 28 or 30 (but rather are connected to the data network 12), physical terminal numbers (PTNs) are not used. However, telephones 40 and other telephones connected over TDM lines are associated with PTNs in the switch system 28 or 30.

Figure 2:
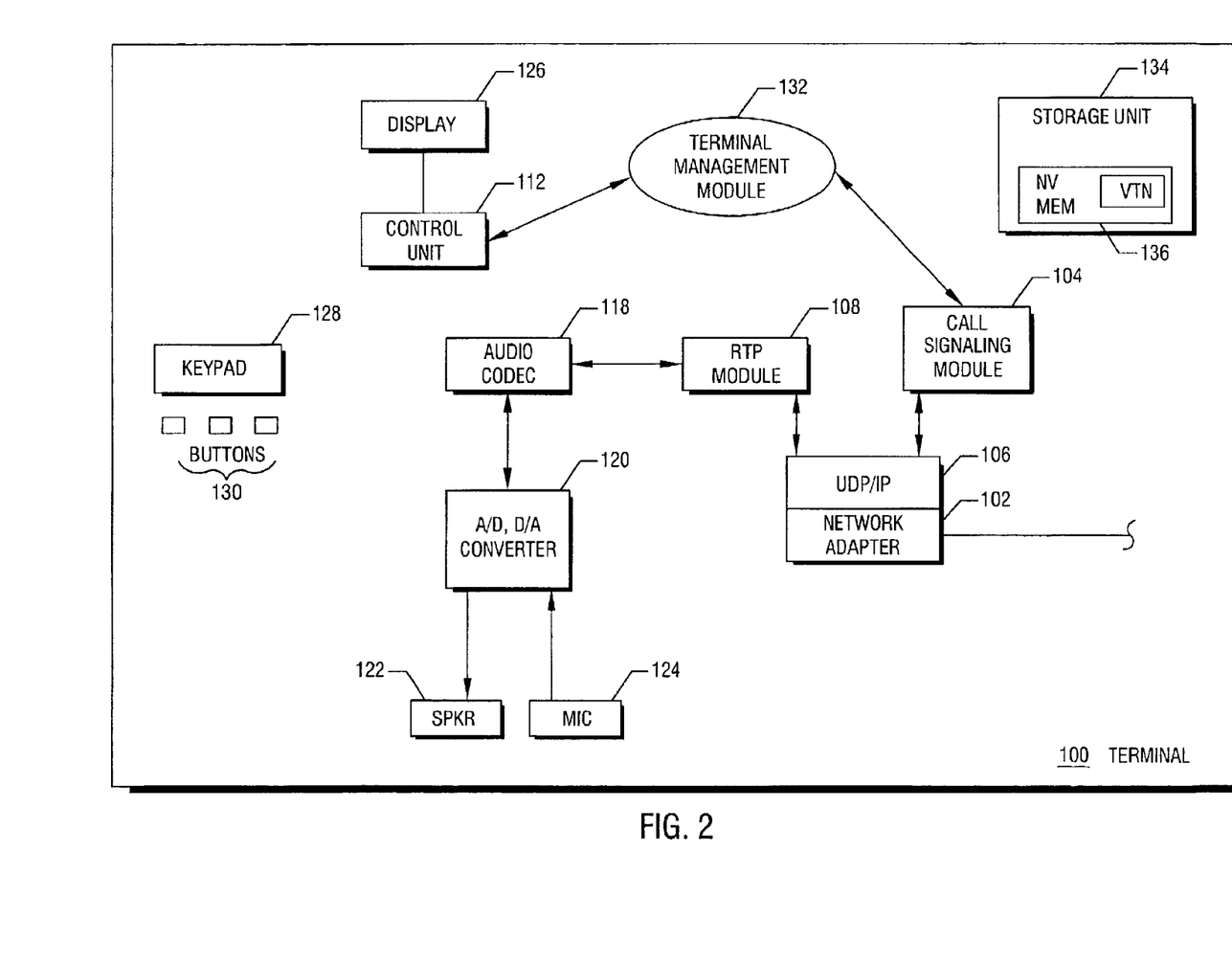
FIG. 2 is a block diagram of components of an example network terminal useable in the communications system of FIG. 1.

Referring to FIG. 2, components of a network terminal 100 (one of the terminals 14, 16, 18, 20, and 22) according to one example arrangement are illustrated. The network terminal 100 includes a network adapter 102 that is coupled to the data network 12. In one example, the network adapter 102 is an Ethernet adapter according to the IEEE (Institute of Electrical and Electronics Engineers) 802.3 Standard.

Above the network adapter 102 are several layers, including a UDP/IP (User Data Protocol/Internet Protocol) stack 106, an RTP (Real-Time Protocol) module 108, and a call signaling module 104. UDP, described in RFC 768, entitled "User Datagram Protocol," dated August 1980, is a transport layer for managing connections between network elements over an IP network. RTP is described in RFC 1889, entitled "RTP: A Transport Protocol for Real-Time Applications," dated January 1996. RTP provides a mechanism to carry real-time data (e.g., voice data) in RTP frames. RTP is associated with a Real-Time Control Protocol (RTCP), which enables communication of control signaling associated with the RTP data.

The call signaling module 104 controls the exchange of messaging (e.g., stimulus messaging) between the network terminal 100 and the switch system 28 or 30. The messaging format between the network terminal 100 and the switch system 28 or 30 may be any predetermined format that allows call establishment and control to be performed. One such format is the Unified Networks IP Stimulus Protocol (UNISTIM) provided by Nortel. One version of UNISTIM is described in U.S. patent application Ser. No. 09/307,356, entitled "Telephony and Data Network Services at a Telephone," filed on May 7, 1999, which is hereby incorporated by reference. However, in other embodiments, other types of signaling formats can be used.

Packets received by the network interface 102 are passed up through the several layers 102 and 106. Control packets are transmitted by the UDP/IP stack 106 to the call signaling module 104, which can be implemented as a software routine executable on a control unit 112.

Inbound RTP frames containing voice data are passed to the RTP module 108, which extracts the voice data. The voice data is passed to an audio coder/decoder (CODEC) 118 to decode the voice data. The voice data is then passed through a digital-to-analog (D/A) converter 120, which outputs the analog signals to a speaker 122. In the reverse path, voice signals received through a microphone 124 is converted into digital format by the analog-to-digital (A/D) converter 120, which passes the voice data to the audio CODEC 118 for encoding. The voice data is placed into RTP frames by the RTP module 108 for transmission to the data network 12 in UDP/IP packets.

The network terminal also includes a display 126. If the network terminal 100 is a telephone, then a keypad 128 and various buttons 130 (e.g., speed dial buttons, a transfer button, a hold button, a redial button, function buttons, and other control buttons) are also provided. If the network terminal 100 is a computer, then the user interface may be provided in the display 126 in graphical form.

A management module 132 is also executable in the network terminal 100. For example, the management module 132 is responsible for performing initialization tasks and other call management tasks. During initialization, a virtual terminal number (VTN) is assigned to the terminal 100, which can be stored in a storage unit 134. The VTN is stored in a non-volatile portion 136 of the storage unit 134.

Figure 3:
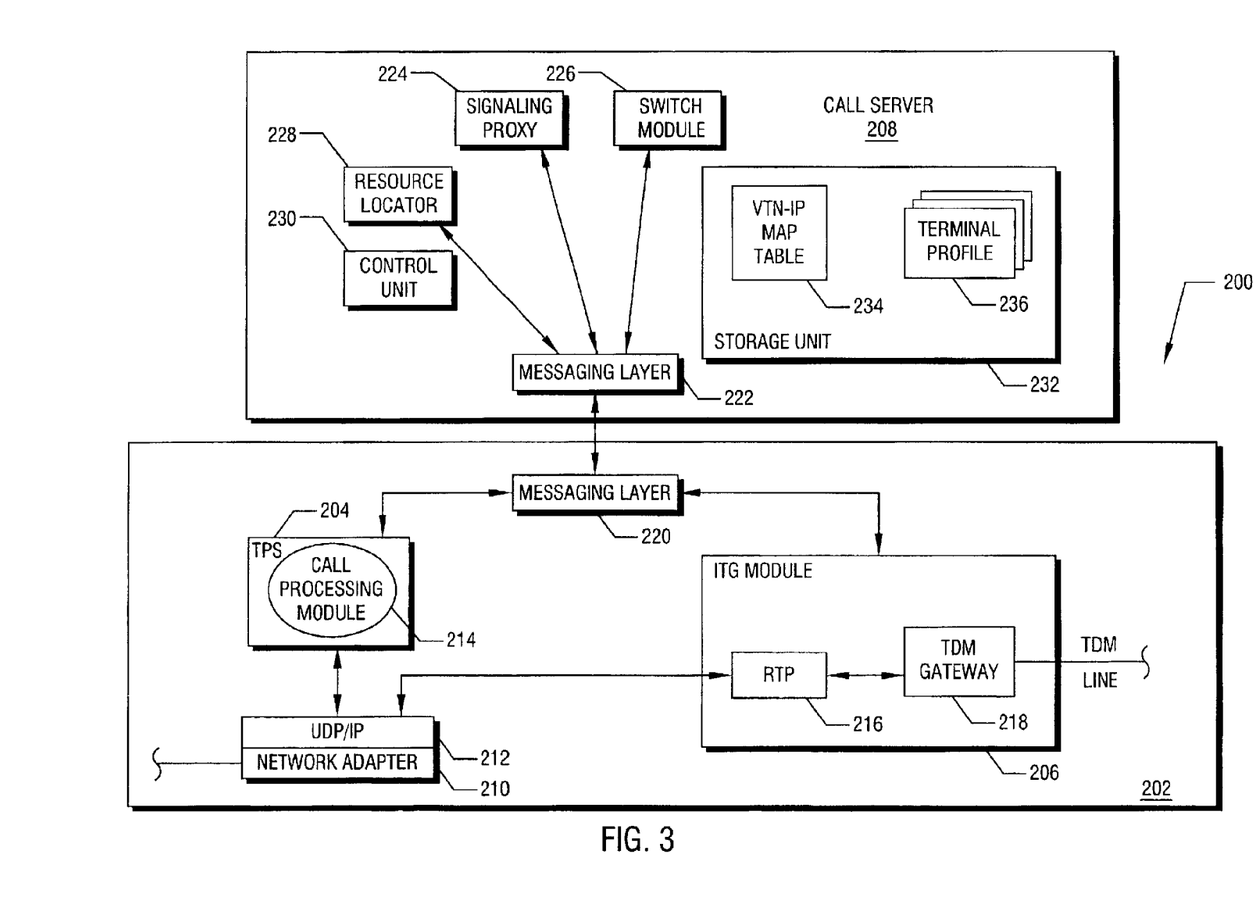
FIG. 3 is a block diagram of components of a network-enabled switch system useable in the communications system of FIG. 1.

Referring to FIG. 3, components of a switch system 200 (system 28 or 30 in FIG. 1) according to one arrangement are illustrated. The illustrated arrangement is provided as an example only, since other embodiments can utilize other types arrangements. The switch system 200 includes a card or platform 202 (35 or 45 in FIG. 1) that contains a TPS 204 (32 or 42 in FIG. 1) and an ITG module 206 (36 or 46 in FIG. 1). The switch system 200 also includes a call server 208 (34 or 44 in FIG. 1) that is coupled to the card or platform 202.

A network adapter 210 communicates frames over the data network 12. Inbound and outbound data is routed through a UDP/IP stack 212. Call control signaling (such as those originated by the call signaling module 104 in the terminal 100 (FIG. 2) are routed to a call processing module 214 in the TPS 204. Voice data is routed to an RTP module 216 in the ITG module 206. The ITG module 206 also includes a TDM gateway 218, which converts voice data between the format provided from the RTP module 216 and TDM format.

To communicate with the call server 208, the TPS 204 and the ITG module 206 communicates through a messaging layer 220. The signaling format of the messaging layer 220 may be different from the signaling format between the TPS 204 and the network terminal 100.

The call server 208 includes a messaging layer 222, a signaling proxy 224, a switch module 226, and a resource locator 228. The modules 222, 224, and 226 may be software modules executable on a control unit 230. The signaling proxy 224 provides the interface to send messages through the messaging layer 222. The switch module 226 is responsible for the switching of calls involving terminals coupled to the network 12 as well as TDM lines connected to the switch system 200. In addition, the switch module 226 provides a number of services to the network terminals, such as voice mail, telephony features such as call forwarding and speed dial, computer-based applications such as database lookup, and so forth. The resource locator 228 maintains the mapping between VTN, hardware or terminal identifier (ID), and the IP address of the TPS 204.

The signaling proxy 224 or the switch module 226 maintains a table 234 in a storage unit 232 that maps VTNs to IP addresses of corresponding network terminals. Thus, given a VTN of a network terminal, its IP address can be determined from the mapping table 234. The storage unit 232 also contains network terminal profiles 236 associated with respective network terminals 100. Based on the VTN of a network terminal involved in a call, the corresponding network terminal profile 236 is accessed to perform call functions or other tasks.

Figure 4A:
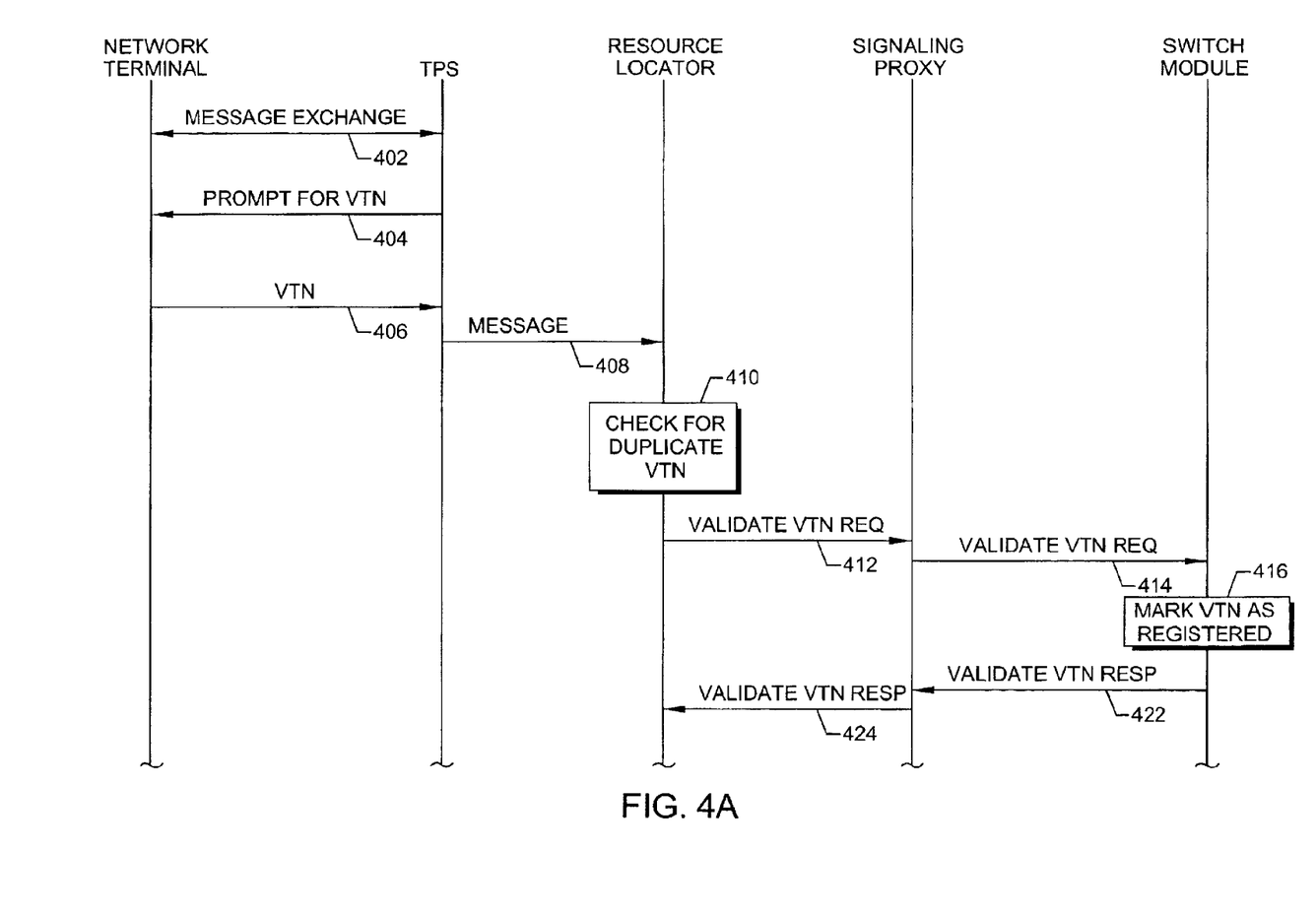
FIGS. 4A–4B are a message flow diagram of a process of setting up a network terminal with a switch system.
Figure 4B:
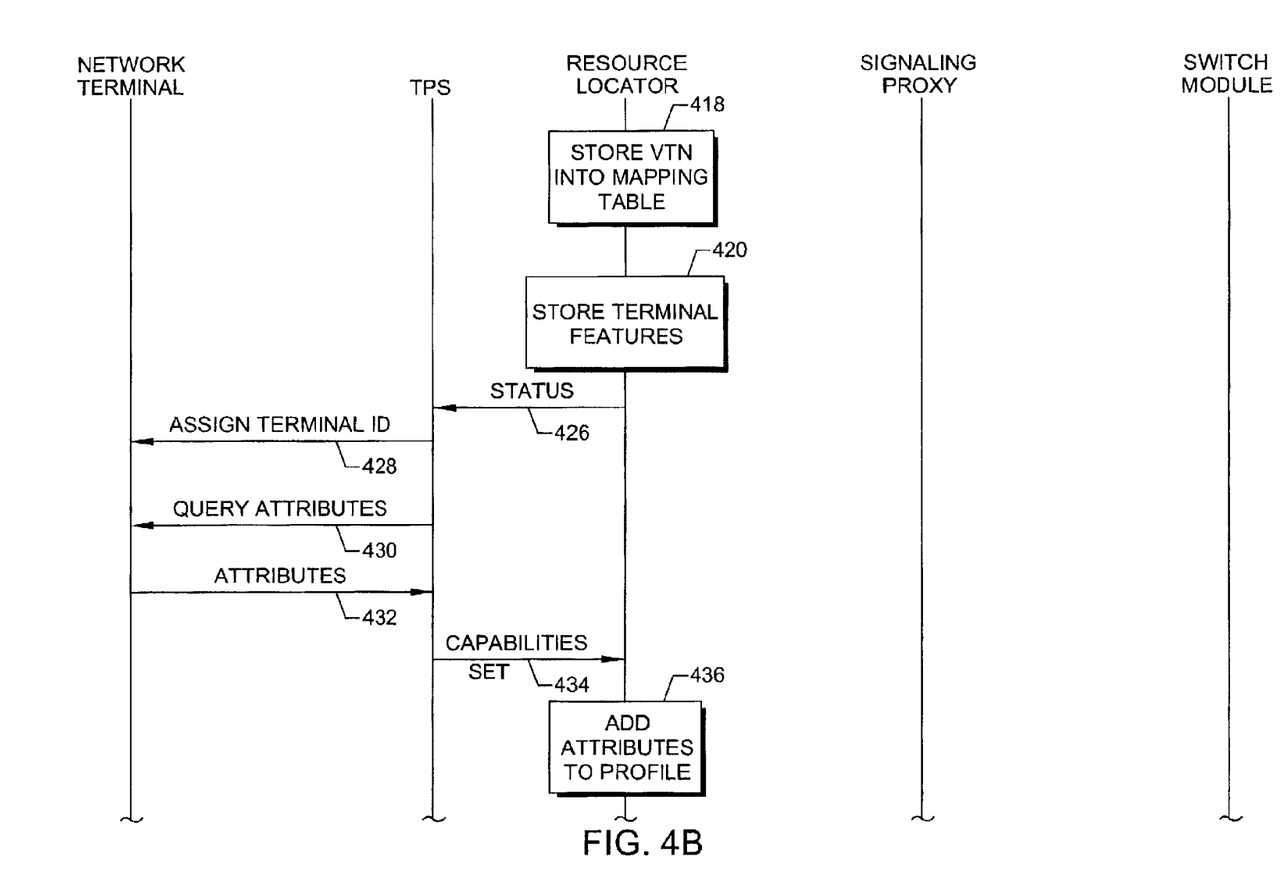

Referring to FIGS. 4A–4B, a process of performing network terminal initialization is illustrated. The illustrated process is provided as an example only, since other flows can be performed in other embodiments. In the call flow of FIGS. 4A-4B, it is assumed that the network terminal 100 has not been registered and thus is not associated with a VTN. When a network terminal 100 powers up, it performs an exchange (at 402) of messages with the TPS 204 to start initialization. The TPS 204 prompts (at 404) the network terminal 100 for its VTN. The VTN can then be entered by an operator of the terminal 100, with the VTN communicated (at 406) to the TPS 204. Next, the TPS 204 sends a message (at 408) to the resource locator 228 in the call server 208. The message contains the IP address of the TPS 204, the VTN of the terminal 100, and the IP address of the terminal 100.

The resource locator 228 then checks (at 410) for a duplicate VTN by accessing the table 234. If a duplicate VTN is not found, then the resource locator 228 sends a Validate VTN Request (at 412) to the signaling proxy 224. The Validate VTN Request contains the VTN of the registering network terminal 100. The signaling proxy 224 forwards (at 414) the Validate VTN Request to the switch module 226, which marks (at 416) the VTN as being registered.

The switch module 226 returns (at 422) a Validate VTN Response to the signaling proxy 224, which forwards the response (at 424) to the resource locator 228. The resource locator 228 stores (at 418) the VTN (and its associated IP address) into the mapping table 234. In addition, a profile 236 is added (at 420) into the storage unit 232 for the registering network terminal 100.

The resource locator 228 then sends a status message (at 426) to the TPS 204, which assigns (at 428) a terminal (or hardware) ID to the network terminal 100. The TPS 204 also sends (at 430) a query to the network terminal 100 for various attributes (e.g., audio driver attributes). In response to the query, the network terminal 100 sends (at 432) the attribute information to the TPS 204, which forwards (at 434) the information to the resource locator 228. The resource locator adds (at 436) the attribute information to the profile 236. Further information, such as programming or configuration information associated with the various buttons of the network terminal 100, may also be communicated when available to the resource locator 228 to add to the terminal profile 236. For example, a number can be associated with a speed dial button, and a predefined task can be associated with a function button on the network terminal.

More generally, such information relates to the features or capabilities of the network terminal. By keeping such information in the switch system, the capabilities (and thus costs) of the network terminal can be kept at a minimum. Multiple profiles 236 in the storage unit 232 are associated with VTNs. Components of the call server are able to conveniently access the profiles by using the VTNs of the network terminals. In one example, the information pertaining to the features or capabilities of the network terminal relate to private branch exchange (PBX) capabilities or capabilities of other types of private exchange systems (e.g., key telephone systems, Centrex systems, etc.).

Figure 5A:
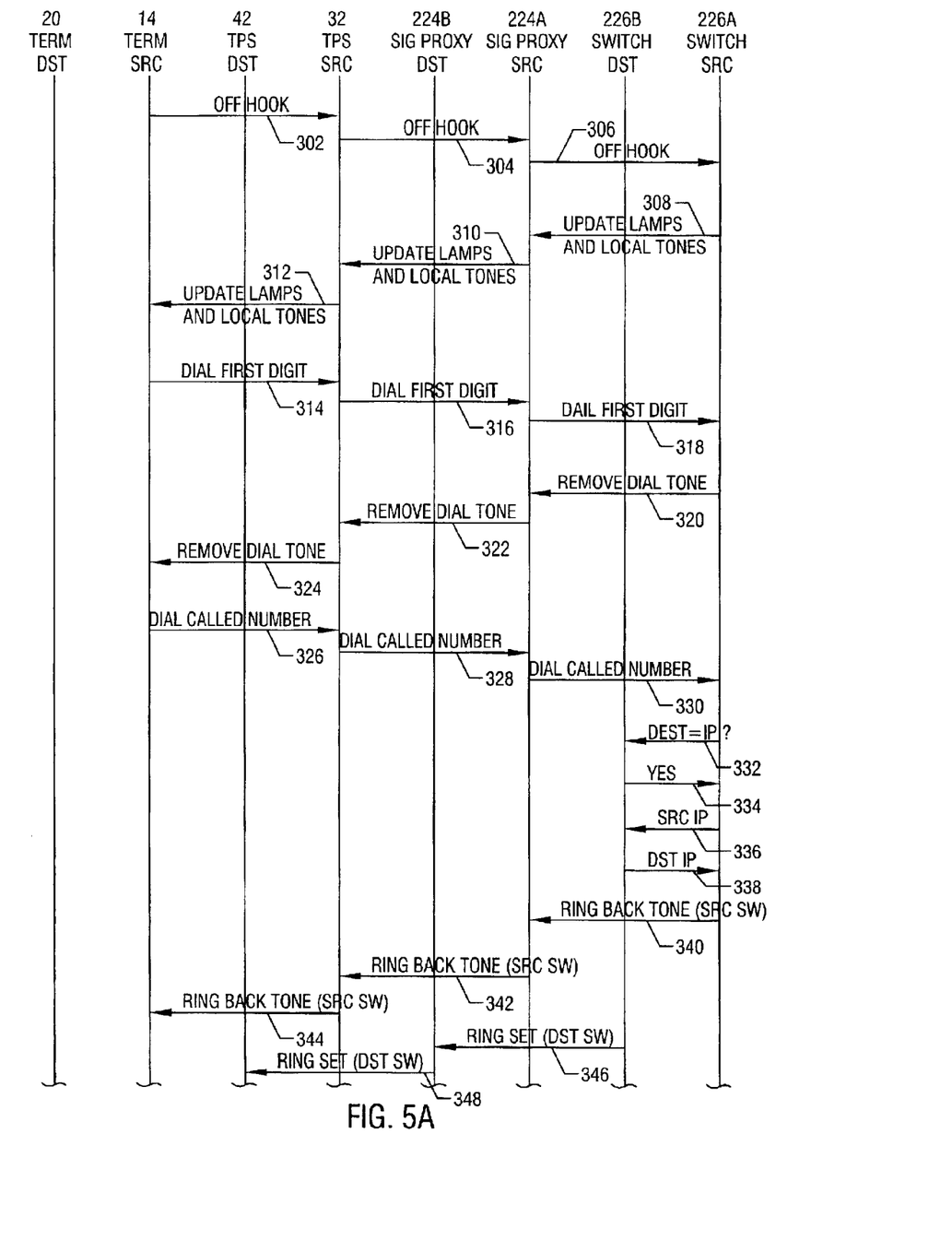
FIGS. 5A–5B are a message flow diagram of a call setup sequence in accordance with an embodiment.
Figure 5B:
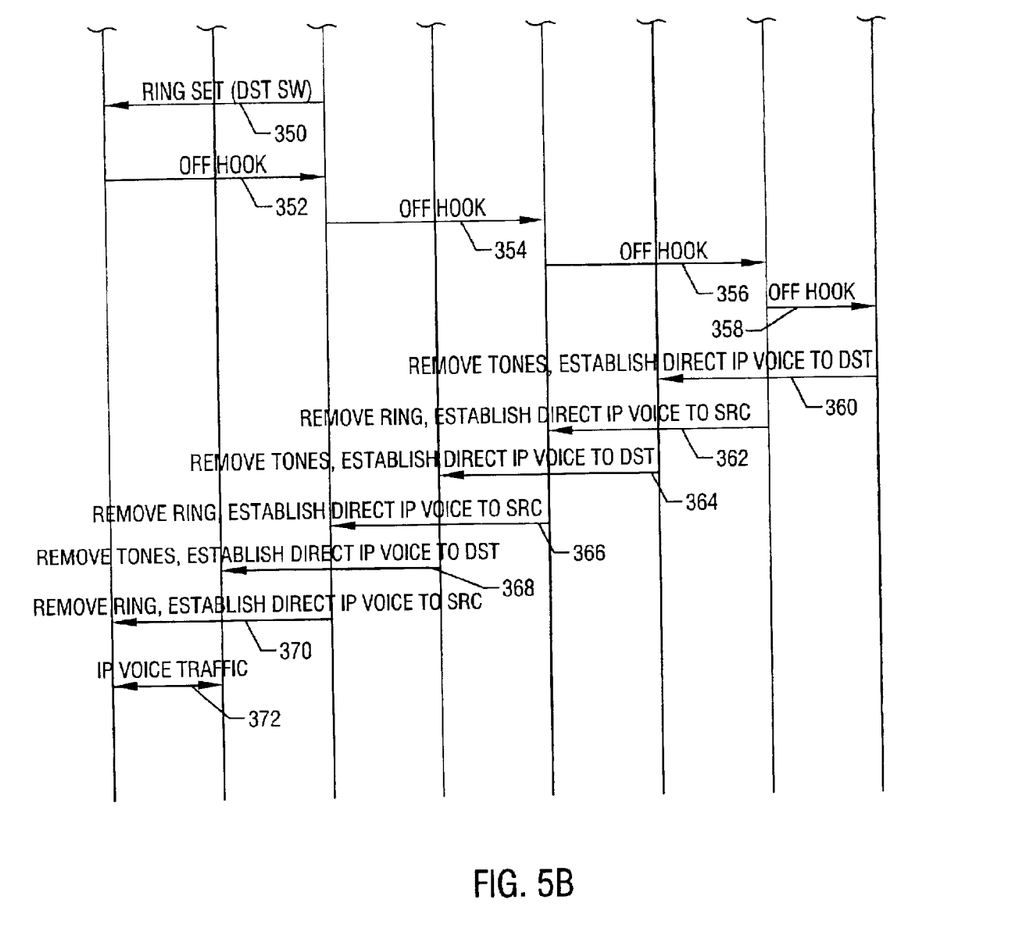

Referring to FIGS. 5A–5B, a call flow to establish a call session between the network terminal 14 (associated with the first switch system 28) and the network terminal 20 (associated with the second switch system 30) is illustrated. When the network terminal 14 is taken off hook, an off-hook indication is sent (at 302, 304, and 306) to the switch module 226A (associated with the first switch system 28). In the communication at 304 between the TPS 32 and the signaling proxy 224A (in the first switch system 28), the TPS 32 includes the VTN of the network terminal 14 so that the signaling proxy 224A and the switch module 226A can readily identify the source terminal. The TPS 32 can determine the VTN of the network terminal 14 by accessing the mapping table 234 (FIG. 3).

Messages to update lamps and to produce a dial tone are sent from the switch module 226A (at 308, 310, and 312) back to the source network terminal 14. Upon receiving a dialed digit, the digit is communicated (at 314, 316, and 318) from the network terminal 100 to the switch module 226A. Upon receiving the dialed digit, the switch module 226A sends (at 320, 322, and 324) an indication back to the source network terminal 100 to remove the dial tone. The user continues to dial the remaining digits, which are sent (at 326, 328, and 330) to the switch module 226A.

Alternatively, instead of dialing digits, the user can activate a speed dial button, with an indication sent to the switch module 226A. Based on the VTN of the source network terminal 14, the switch module 226A accesses the profile 236 of terminal 14 to determine what number to dial. In other operations, other buttons may be activated by the user to perform other functions (e.g., call forwarding, call hold, etc.). In connection with activation of some or all of these buttons, the profile 236 is used to determine what action to take.

In response to the dialed number, the switch module 226A sends a message (at 332) over the packet-based trunk or virtual trunk to the switch module 226B in the second switch system 30. The message is a query to determine if the destination terminal is a network terminal (e.g., an IP terminal) or a TDM terminal. The second switch module 226B sends (at 334) a response back to the switch module 226A. In the example, the destination terminal is a network terminal. In response, the first switch module 226A sends (at 336) the source IP address of the source network terminal 14 to the second switch module 226B. In response, the second switch module 226B sends (at 338) the IP address of the destination terminal 20. The destination terminal IP address can be determined based on the directory number received from the source network terminal 14.

Next, the switch module 226A sends a ring back tone (at 340, 342, and 344) to the source network terminal 14. At about the same time, the second switch module 226B sends an alert or ring indication (at 346, 348, and 350) to the destination network terminal 20. If the destination user answers by picking up the handset of the destination terminal 20, then an off-hook indication is sent (at 352, 354, and 356) from the destination terminal 20 to the switch module 226B. The off-hook or some other answer indication is also sent (at 358) by the second switch 226B to the first switch module 226A over the packet-based trunk.

Once the first switch module 226A determines that the destination terminal has answered, the switch module 226A sends (at 360, 364, and 368) one or more messages to the source network terminal 14 to remove the ring tone and to establish a direct IP path between the network terminals 14 and 20. Similarly, the second switch module 226B also sends (at 362, 366, and 370) one or more messages to the destination network terminal 20 to remove the ring or alert indication and to establish the IP path between the terminals. The IP path establishment messages sent to the network terminal 14 contains the IP address of the network terminal 20, and vice versa. At this point, an RTP path is established (at 372) between the network terminals 14 and 20, where voice data can be exchanged.

Instructions of the various software routines or modules discussed herein may be stored on one or more storage units in corresponding systems and devices and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can be made up of one component or plural components.

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding system or device to perform programmed acts.

The instructions of the software routines or modules are loaded or transported into the system or device in one of many different ways. For example, code segments including instructions stored on floppy disks, CD or DVD media, a hard disk, or transported through a network interface card, modem, or other interface device are loaded into the node and executed as corresponding software routines or modules. In the loading or transport process, data signals that are embodied in carrier waves (transmitted over telephone lines, network lines, wireless links, cables, and the like) communicate the code segments, including instructions, to the node. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of establishing a call session over a packet-based network, comprising:
   receiving, in a first switch, a call request over the packet-based network from a first terminal associated with a logical identifier, the call request targeting a second terminal coupled to a second switch;
   storing, in the first switch, information relating to features of the first terminal, the information associated with the logical identifier;
   sending, from the first switch, a request over a packet-based trunk to the second switch in response to the call request;
   sending, from the first switch to the first terminal, a media connection request containing a network address of the second terminal to enable the first terminal to establish a media path with the second terminal over the packet-based network; and
   the first switch interacting with the first terminal to establish a call session based on the call request,
   wherein the media connection request from the first switch enables the first terminal to communicate over the media path of the call session with the second terminal without passing through the first and second switches.

2. The method of claim 1, wherein receiving the call request comprises receiving an off-hook indication and a dialed number.

3. The method of claim 2, wherein receiving the call request comprises receiving a network address of the first terminal.

4. The method of claim 3, further comprising determining the logical identifier based on the network address.

5. The method of claim 2, wherein the network address comprises an Internet Protocol address.

6. The method of claim 1, wherein the logical identifier comprises a virtual terminal number.

7. The method of claim 1, wherein storing the information comprises storing the information in a profile associated with the logical identifier.

8. The method of claim 7, further comprising storing other profiles of other terminals associated with other logical identifiers.

9. The method of claim 1, wherein storing the information comprises storing configuration information relating to one or more buttons of the first terminal.

10. The method of claim 1, further comprising the second switch sending a second media connection request to the second terminal, the second media connection request containing a network address of the first terminal to enable the second terminal to communicate over a media path with the first terminal over the packet-based network.

11. The method of claim 1, further comprising:
    receiving, in the first switch, a second call request over a circuit-switched link from a third terminal;
    establishing, by the first switch, a second call session involving the third terminal over the packet-based network in response to the second call request; and
    converting, by a telephony gateway in the first switch, between voice traffic in circuit-switched formant and voice traffic in packet format in the second call session.

12. The method of claim 11, wherein the receiving acts, storing act, sending acts and establishing act are performed by a call server in the first switch.

13. A method of establishing a call session over a packet-based network, comprising:

receiving, in a first switch, a call request over the packet-based network from a first terminal associated with a logical identifier, the call request targeting a second terminal coupled to a second switch;

storing, in the first switch, information relating to features of the first terminal, the information associated with the logical identifier;

sending, from the first switch, a request over a packet-based trunk to the second switch in response to the call request; and sending, from the first switch to the first terminal, a media connection request containing a network address of the second terminal to enable the first terminal to establish a media path with the second terminal over the packet-based network, wherein storing, in the first switch, information relating to features of the first terminal comprises storing information relating to a speed dial feature of the first terminal that is coupled to the first switch over a packet-based network.

14. The method of claim 13, further comprising accessing the information in response to the call request to perform a predetermined action.

15. The method of claim 14, wherein receiving the call request comprises receiving an indication of activation of a button on the first terminal.

16. The method of claim 15, wherein accessing the information comprises accessing a telephone number to dial in response to the activation of a speed dial the button.

17. A switch system for establishing calls over a packet-based network, comprising:

an interface adapted to communicate over the packet-based network;

a controller communicatively coupled to the interface and adapted to receive a call request over the packet-based network from a first terminal, the first terminal associated with a logical identifier, the call request targeting a second terminal that is coupled to a second switch system, the controller adapted to further send signaling to the second switch system over a packet-based trunk provided over the packet-based network; and a storage unit containing information relating to features of the first terminal, the information associated with the logical identifier of the first terminal, wherein the controller is adapted to send a media connection request to the first terminal, the media connection request containing a network address of the second terminal to enable the first terminal to establish a media path with the second terminal over the packet-based network, wherein the controller is adapted to interact with the first terminal to establish a call session based on the call request and the media connection request enables the first terminal to communicate over the media path of the call session with the second terminal without passing though the first and second switches.

18. The system of claim 17, wherein the logical identifier comprises a virtual terminal number.

19. The system of claim 18, wherein the storage unit further comprises a table mapping the virtual terminal number to a network address.

20. The system of claim 19, wherein the network address comprises an Internet Protocol address.

21. The system of claim 19, wherein the table comprises plural virtual terminal numbers mapped to corresponding plural network addresses.

22. The system of claim 17, wherein the storage unit contains a profile associated with the logical identifier of the first terminal, the profile containing the information relating to features.

23. The system of claim 22, wherein the storage unit contains at least another profile associated with at least another logical identifier of another terminal.

24. The system of claim 17, wherein the signaling between the switch systems comprise signaling to determine if the second terminal is a network terminal capable of communicating over the packet-based terminal.

25. The switch system of claim 17, wherein the controller is adapted to:

receive a second call request over a circuit-switched link from a third terminal;

establish a second call session involving the third terminal over the packet-based network in response to the second call request; and the switch system further comprising a telephony gateway to convert between voice traffic in circuit-switched format and voice traffic in packet format in the second call session.

26. A switch system for establishing calls over a packet-based network, comprising:

an interface adapted to communicate over the packet-based network;

a controller communicatively coupled to the interface and adapted to receive a call request over the packet-based network from a first terminal, the first terminal associated with a logical identifier, the call request targeting a second terminal that is coupled to a second switch system, the controller adapted to further send signaling to the second switch system over a packet-based trunk provided over the packet-based network; and a storage unit containing information relating to features of the first terminal, the information associated with the logical identifier of the first terminal, the information including a telephone number for a speed-dial button of the first terminal.

27. An article comprising at least one storage medium containing instructions that when executed cause a first switch to:

receive a request over a packet-based network from a first terminal, the terminal associated with a logical identifier;

access a profile associated with the logical identifier;

use information in the profile to send signaling to a second switch to establish a call session with a second terminal;

send a media connection request to the first terminal, the media connection request containing a network address of the second terminal to enable the first terminal to establish a media path with the second terminal over the packet-based network; and interact with the first terminal to establish the call session based on the received request, wherein the media connection request enables the first terminal to communicate over the media path of the call session with the second terminal without passing through the first and second switches.

28. An article comprising at least one storage medium containing instructions that when executed cause a first switch to:

receive a request over a packet-based network from a first terminal, the terminal associated with a logical identifier;

access a profile associated with the logical identifier; and use information in the profile to send signaling to a second switch to establish a call session with a second terminal, wherein accessing the profile comprises accessing a profile containing information relating to a speed dial feature of the first terminal.

29. A data signal embodied in a carrier wave and comprising instructions that when executed cause a first switch to:

receive a call request over the packet-based network from a first terminal associated with a logical identifier, the call request targeting a second terminal coupled to a second switch;

store information relating to features of the first terminal, the information associated with the logical identifier;

send a request over a packet-based trunk to the second switch in response to the call request;

send a media connection request to the first terminal containing a network address of the second terminal to enable the first terminal to establish a media path with the second terminal over the packet-based network; and interact with the first terminal to establish a call session based on the call request, and wherein the media connection request enables the first terminal to communicate over the media path of the call session with the second terminal without passing through the first and second switches.

30. A data signal embodied in a carrier wave and comprising instructions that when executed cause a first switch to:

receive a call request over the packet-based network from a first terminal associated with a logical identifier, the call request targeting a second terminal coupled to a second switch;

store information relating to features of the first terminal, the information associated with the logical identifier;

send a request over a packet-based trunk to the second switch in response to the call request; and send a media connection request to the first terminal containing a network address of the second terminal to enable the first terminal to establish a media path with the second terminal over the packet-based network, wherein storing the information relating to features of the first terminal comprises storing information relating to a speed dial feature of the first terminal that is coupled to the first switch over the packet-based network.

* * * * *